Patented Oct. 29, 1940

2,220,034

UNITED STATES PATENT OFFICE 2,220,034

DYES IN CYANIDATION

Robert Ben Booth, Springdale, Conn., assignor to American Cyanamid Company, New York, N. Y., a corporation of Maine No Drawing. Application August 22, 1939,
Serial No. 291,321

14 Claims. (Cl. 75—105)

The present invention relates to cyanide treatment of ores and other materials containing precious metals. It is particularly concerned with a method of increasing the extraction of precious metals from ores, concentrates, tailings and the like.

The cyanide treatment of ores in which an aqueous alkaline solution of a cyanide is used to dissolve the gold and silver from their ores results in variable amounts of precious metal being left behind in the tailings, depending upon the type of ore material and the conditions under which the cyanidation is carried out. Therefore, in the recovery of precious metals by cyanidation, it is usually necessary to determine whether the quantities extracted from a particular ore, concentrate, tailing, etc., are large enough to be profitable from a practical viewpoint. Certain precious metal bearing materials can be profitably cyanided and yet leave appreciable amounts of previous metal behind in the tailing. A method of reducing the amount of precious metals left behind will result in increased profits when cyaniding such a material. Other precious metal bearing materials, for example, tailings from the various mining operations, may contain relatively small amounts of previous metals that cannot always be profitably recovered by cyanidation, but might be if the process resulted in a more complete extraction.

The precious metal ores often contain substances which hinder the recovery by cyanidation or increase the time required for treatment and the cost of such recovery. For example, carbonaceous ores, concentrates, tailings and the like are often difficult to cyanide profitably as the carbon causes precipitation of gold from the cyanide solution which results in high cost or poor tailings. The present invention is not limited to any particular type ore; however, the greatest improvements are obtained when the process is used in connection with ores that are difficult to cyanide, such as the carbonaceous ores.

According to the present invention, ores, concentrates, tailings and the like which contain precious metals are treated with a dyestuff prior to and/or during the cyanidation which results in increased extraction of precious metal by the cyanide solution.

The dyestuffs or coloring substances applicable to the present invention include those having solubilizing groups such as the sulfonic acid and carboxylic group. While dyes containing solubilizing groups in general are operative, with certain materials there is a difference in effectiveness between different solubilized dyes. I have found that three coloring matters give excellent results, these being sulfonated nigrosine (C. I. 865), sulfonated beta-naphthol still tar, and a soluble earth color of fossilized vegetation found near the surface of the earth in the sandy soils of Florida and certain European countries, sold in the trade as "sap brown." "Sap brown" is classified as a soluble natural coloring matter in the fifth edition of "A Text-Book of Paper-Making," by Cross and Bevan, distributed by Chemical Publishing Company of N. Y., Inc. A definition of "sap brown" is found on page 272 of the above text-book. These three preferred colors have the economic value of being very cheap and can be used in a crude form eliminating purification costs. The reason why the soluble dyes of the present invention produce the improved results is not yet determined and the present invention is not limited to any particular theory of action.

The coloring matters of the present invention have been shown to aid in flotation and other metallurgical operations as pointed out in my copending applications, Serial No. 259,577, filed March 3, 1939, and Serial No. 216,291 filed June 28, 1938. Therefore, it is an advantage of the present invention that cyanidation following flotation or other metallurgical operations that have used the dyestuffs of the present invention is also aided by the presence of the dyestuffs.

It is also an advantage of the present invention that the use of the coloring matters speeds up the rate of recovery in cyanidation processes and thus increases the efficiency of plant operation.

The invention will be described in greater detail in conjunction with the following specific examples which will illustrate the application of the invention to various materials.

*Example 1*

A gold-silver ore from California, containing free gold, argentite, ruby silver, pyrite, chalcocite, galena, quartz, clay and limonite and assaying about 0.34 oz./ton Au, 13.4 oz./ton Ag, 2.7% Fe, 0.1% S, and 93.6% insoluble, was ground in separate tests with 1.0 lb./ton nigrosine and "sap brown" to about minus 65 mesh and 78% minus 200 mesh. The resulting pulp was diluted to about 25% solids and cyanided for 48 hours. The results of these tests were compared with those of a control test similarly conducted but in the absence of dyes. The results of these tests are given in the following table:

Bi, 33.4% Fe, 2.8% Pb, 0.7% Zn, and 10.9% insoluble, was ground in separate tests to minus 65 mesh and about 65% minus 200 mesh in the presence of 1.0 lb./ton "sap brown" and 1.0 lb./ton sulfonated beta-naphthol tar and then cyanided for 6 hours. Another sample of concentrate was similarly treated except that no coloring matter was used in this test. The results of these tests are summarized in the following table:

| Test No. | Coloring matter used | Feed, oz./ton | | Tailing, oz./ton | | Extracted | | | | Reagents consumed lbs./ton | |
|---|---|---|---|---|---|---|---|---|---|---|---|
| | | Au | Ag | Au | Ag | Oz./Au | Percent Au | Percent Ag | Oz./Ag | NaCN | CaO |
| 1B | None | 4.090 | 51.68 | 0.810 | 37.28 | 3.280 | 80.20 | 27.86 | 14.40 | 10.90 | 5.99 |
| 2B | 1.0 lb./ton "sap brown" | 4.120 | 51.17 | 0.780 | 36.10 | 3.340 | 81.07 | 29.45 | 15.07 | 10.26 | 6.35 |
| 3B | 1.0 lb./ton sulfonated beta-naphthol tar | 3.957 | 51.63 | 0.680 | 36.90 | 3.277 | 82.82 | 28.53 | 14.73 | 10.97 | 5.67 |

Twenty-four hour cyanidation tests were also conducted on this concentrate. In the following table, the results obtained by grinding with

| Test No. | Dye used | Feed, oz./ton | | Tailing, oz./ton | | Extracted | | Reagent consumed, lbs./ton | |
|---|---|---|---|---|---|---|---|---|---|
| | | Au | Ag | Au | Ag | Percent Au | Percent Ag | NaCN | CaO |
| 1 | None | 0.340 | 13.37 | 0.024 | 2.38 | 92.94 | 82.20 | 2.36 | 17.60 |
| 2 | 1.0 lb./ton nigrosine | 0.356 | 13.51 | 0.025 | 1.61 | 92.98 | 88.08 | 2.07 | 18.24 |
| 3 | 1.0 lb./ton "sap brown" | 0.341 | 13.43 | 0.023 | 1.66 | 93.26 | 87.64 | 1.92 | 19.00 |

*Example 2*

A Utah silver ore containing pyrite, silver-bearing galena, limonite, and quartz and assaying about 20.7–21.4 ozs./ton Ag, 0.04 oz./ton Au, 1.0 lb./ton nigrosine and 1.0 lb./ton sulfonated beta-naphthol tar followed by cyanidation are compared with those of a control test conducted in the absence of a coloring matter:

| Test No. | Coloring matter used | Feed, oz./ton | | Tailing, oz./ton | | Extracted | | | | Reagents consumed lbs./ton | |
|---|---|---|---|---|---|---|---|---|---|---|---|
| | | Au | Ag | Au | Ag | Oz. Au | Percent Au | Percent Ag | Oz. Ag | NaCN | CaO |
| 1C | None | 4.115 | 51.38 | 0.570 | 34.70 | 3.545 | 86.15 | 32.46 | 16.68 | 11.75 | 12.48 |
| 2C | 1.0 lb./ton nigrosine | 4.045 | 51.43 | 0.500 | 34.14 | 3.545 | 87.64 | 33.62 | 17.29 | 12.21 | 12.68 |
| 3C | 1.0 lb./ton sulfonated beta-naphthol tar | 4.037 | 51.70 | 0.490 | 34.38 | 3.547 | 87.86 | 33.50 | 17.32 | 12.00 | 12.23 |

3.4% Pb, 16.4% Fe, and 9.5% S was ground to minus 65 mesh and about 58% minus 200 mesh in the presence of 1.0 lb./ton nigrosine and cyanided for 6 hours. A similar test was conducted with 1.0 lb./ton sulfonated beta-naphthol tar instead of the nigrosine. A control test without coloring matter was also conducted for purposes of comparison. The results of both tests are presented in the following table:

*Example 4*

A South African carbonaceous gold ore containing gold, pyrite, chalcopyrite, pyrrhotite, quartz and carbonaceous material and assaying about 0.20 oz./ton Au, was ground to minus 65 mesh and about 67% minus 200 mesh. Separate samples of this ground pulp were treated at about 50% solids with 5.0 lbs./tons "sap brown"

| Test No. | Coloring matter used | Feed, oz./ton Ag | Tailing, oz./ton Ag | Extracted | | Reagent consumed, lbs./ton | |
|---|---|---|---|---|---|---|---|
| | | | | Oz. Ag | Percent Ag | NaCN | CaO |
| 1A | None | 20.66 | 8.64 | 12.02 | 58.18 | 11.38 | 16.90 |
| 2A | 1.0 lb./ton nigrosine | 21.44 | 8.39 | 13.05 | 60.87 | 11.13 | 16.60 |
| 3A | 1.0 lb./ton sulfonated beta-naphthol tar | 20.72 | 8.40 | 12.32 | 59.46 | 11.43 | 16.40 |

*Example 3*

A concentrate obtained by flotation of a California gold-silver ore, containing pyrite, galena, and chalcopyrite and assaying about 3.9–4.1 ozs./ton Au, 51.2–51.7 ozs./ton Ag, 0.7% Cu, 0.7% and 2.0 lbs./ton nigrosine and then cyanided for 24 hours.

The results of these two tests were compared with those of a control test similarly conducted except that no dyes were used. The results of these tests are summarized in the following table: the presence of sulfonated beta-naphthol still tar.

| Sample | | Oz./ton Au | Percent Au extracted in 24 hours | Reagents consumed, lbs./ton | |
|---|---|---|---|---|---|
| | | | | NaCN | CaO |
| Test 1D | | | 45.00 | 0.59 | 11.55 |
| No dye used | 24 hr. tailing—608.0 g | 0.110 | | | |
| | Feed | 0.200 | | | |
| Test 2D | | | 59.51 | 0.53 | 10.40 |
| 5.0 lbs./ton "sap brown" | 24 hr. tailing—611.0 g | 0.083 | | | |
| | Feed | 0.205 | | | |
| Test 3D | | | 53.44 | 0.54 | 12.07 |
| 2.0 lbs./ton nigrosine | 24 hr. tailing—610.0 g | 0.088 | | | |
| | Feed | 0.189 | | | |

The data in the above tables demonstrates that an increased extraction of precious metals occurred in those tests in which coloring matters were used and also that there was an acceleration of cyanidation.

What I claim is:

1. A method of cyanidation which comprises carrying out the cyanidation in the presence of coloring matter included in the group consisting of sulfonated nigrosine, "sap brown," and sulfonated beta-naphthol still tar.

2. A method of cyanidation which comprises carrying out the cyanidation in the presence of sulfonated nigrosine.

3. A method of cyanidation which comprises carrying out the cyanidation in the presence of "sap brown."

4. A method of cyanidation which comprises carrying out the cyanidation in the presence of sulfonated beta-naphthol still tar.

5. A method of cyaniding precious metal ores which comprises carrying out the cyanidation in the presence of coloring matter included in the group consisting of sulfonated nigrosine, "sap brown," and sulfonated beta-naphthol still tar.

6. A method of cyaniding precious metal ores which comprises carrying out the cyanidation in the presence of sulfonated nigrosine.

7. A method of cyaniding precious metal ores which comprises carrying out the cyanidation in the presence of "sap brown."

8. A method of cyaniding precious metal ores which comprises carrying out the cyanidation in the presence of sulfonated beta-naphthol still tar.

9. A method of recovering precious metals from a carbonaceous ore by cyanidation which comprises subjecting an aqueous pulp of the ore to cyanidation in the presence of coloring matter included in the group consisting of sulfonated nigrosine, "sap brown" and sulfonated beta-naphthol still tar.

10. A method of recovering precious metals from a carbonaceous ore by cyanidation which comprises subjecting an aqueous pulp of the ore to cyanidation in the presence of sulfonated nigrosine.

11. A method of recovering precious metals from a carbonaceous ore by cyanidation which comprises subjecting an aqueous pulp of the ore to cyanidation in the presence of "sap brown."

12. A method of recovering precious metals from a carbonaceous ore by cyanidation which comprises subjecting an aqueous pulp of the ore to cyanidation in the presence of sulfonated beta-naphthol still tar.

13. A method of cyaniding precious metal ore tailings which comprises carrying out the cyanidation in the presence of coloring matter included in the group consisting of sulfonated nigrosine, "sap brown" and sulfonated beta-naphthol still tar.

14. A method of cyaniding precious metal flotation concentrates which comprises carrying out the cyanidation in the presence of coloring matter included in the group consisting of sulfonated nigrosine, "sap brown" and sulfonated beta-naphthol still tar.

ROBERT BEN BOOTH.